United States Patent [19]
Draper et al.

[11] Patent Number: 5,200,279
[45] Date of Patent: Apr. 6, 1993

[54] SOLID OXIDE FUEL CELL GENERATOR

[75] Inventors: Robert Draper, Churchill Boro; Raymond A. George, Pittsburgh; Larry A. Shockling, Plum Borough, all of Pa.

[73] Assignee: Westinghouse Electric Corp., Pittsburgh, Pa.

[21] Appl. No.: 774,932

[22] Filed: Oct. 11, 1991

[51] Int. Cl.$^5$ .............................................. H01M 8/12
[52] U.S. Cl. ...................................... 429/30; 424/31; 424/34; 424/38; 424/39
[58] Field of Search ................. 429/30, 31, 34, 38, 429/39

[56] References Cited

U.S. PATENT DOCUMENTS

| | | | |
|---|---|---|---|
| 3,402,230 | 9/1968 | White | 264/104 |
| 3,460,991 | 8/1969 | White | 136/86 |
| 3,668,010 | 6/1972 | Fally et al. | 136/86 F |
| 4,174,260 | 11/1979 | Schmidberger | 204/260 |
| 4,395,468 | 7/1983 | Isenberg | 429/31 |
| 4,640,875 | 2/1987 | Makiel | 429/30 |
| 4,728,584 | 3/1988 | Isenberg | 429/31 |
| 4,791,035 | 12/1988 | Reichner | 429/31 |
| 4,874,678 | 10/1989 | Reichner | 429/30 |
| 4,898,792 | 2/1990 | Singh et al. | 429/19 |
| 4,910,100 | 3/1990 | Nakanishi et al. | 429/32 |
| 5,047,299 | 9/1991 | Shockling | 429/20 |

Primary Examiner—Olik Chaudhuri
Assistant Examiner—M. Nuzzolillo
Attorney, Agent, or Firm—J. C. Valentine

[57] ABSTRACT

A solid oxide fuel cell generator has a pair of spaced apart tubesheets in a housing. At least two intermediate barrier walls are between the tubesheets and define a generator chamber between two intermediate buffer chambers. An array of fuel cells have tubes with open ends engaging the tubesheets. Tubular, axially elongated electrochemical cells are supported on the tubes in the generator chamber. Fuel gas and oxidant gas are preheated in the intermediate chambers by the gases flowing on the other side of the tubes.

Gas leakage around the tubes through the tubesheets is permitted. The buffer chambers reentrain the leaked fuel gas for reintroduction to the generator chamber.

16 Claims, 2 Drawing Sheets

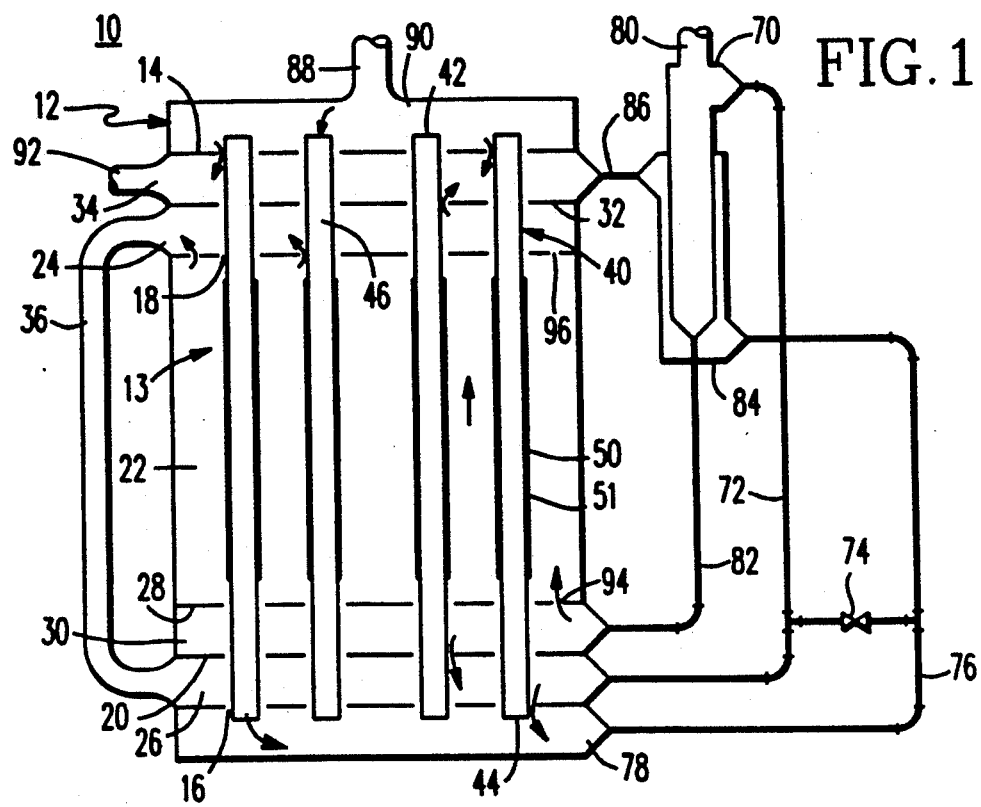
FIG. 1
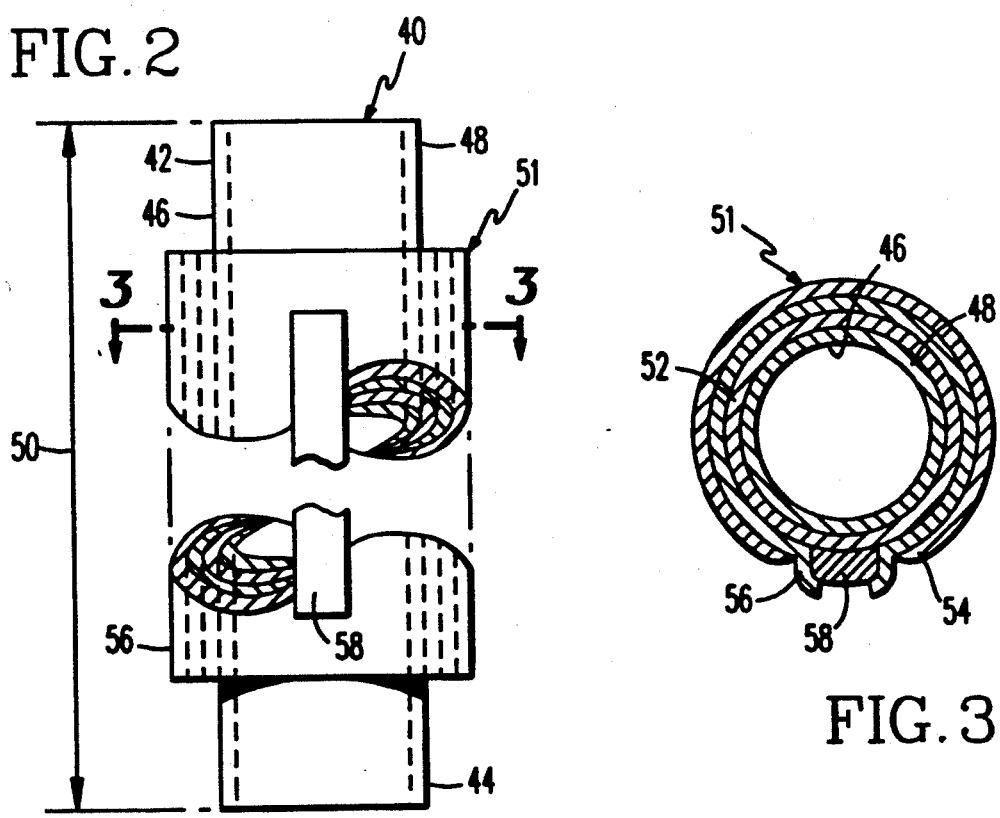
FIG. 2
FIG. 3

SOLID OXIDE FUEL CELL GENERATOR

GOVERNMENT CONTRACT

This invention was made in the performance of Contract DE-AC2180ET-17089 with the United States Department of Energy.

BACKGROUND OF THE INVENTION

This invention relates to a solid oxide fuel cell generator and, more particularly, to a generator having an array of closely spaced, tubular, axially elongated fuel cells for electrochemically reacting a fuel gas with an oxidizing gas.

Solid oxide fuel cell generators are employed to convert the chemical energy of a fuel gas such as natural gas into electrical energy. Typically, generators contain an array of literally hundreds or thousands of fuel cells which must be electrically connected in series and in parallel to produce the desired energy because each fuel cell develops a limited amount of energy at about 0.6 to 1.0 volt. For example, a state-of-the-art fuel cell having an active length of about 30–50 cm will produce approximately 20–40 watts. The fuel gas and an oxidizing gas, which is usually an oxygen-containing gas such as air, electrochemically react across the electrolyte boundary of the fuel cells at about 1000° C. and produce carbon dioxide and water vapor.

State-of-the-art generators are disclosed by U.S. Pat. Nos. 4,898,792; 4,874,678; 4,728,584 and 4,395,468. These patents generally disclose solid oxide fuel cell generators having arrays of tubular, elongated fuel cells comprised of electrochemical cells supported on peripheral surfaces of hollow tubes which extend through a generator chamber. These generators generally employ designs wherein an oxidizing gas (typically air) is introduced into hollow support tubes via internal, concentric, injector tubes which extend at least about half the length of the support tubes The oxidizing gas flows toward the opposite ends of the hollow tubes, exits the injector tubes, reverses direction and flows back through the annulus between the support tubes and the injector tubes. This arrangement is designed to preheat the oxidant gas up to the reaction temperature and also to remove the excess heat generated by the electrochemical reaction in order to maintain the desired operating temperatures in the generator chamber. Typically (where the oxidant gas is air), up to 4–8 times the stoichiometrical amount of the oxidant gas needed to react with the fuel gas is fed into the tubes in order to maintain the nominal reaction temperature and the desired temperature profile in the generator.

Efficient operation of the prior art generators under low power, normal power and high power conditions is limited by many process variables, including the pressure drop of the gases flowing through the injector tubes and in the annular spaces around the injector tubes. The gas flow pressure drop through the tubes and the associated end effects tend to restrict high gas flow during high power conditions for a given generator design. In addition, temperature profiles across generators may vary because the fuel cells located at the peripheries of the generator housings tend to radiate substantial amounts of heat to the housings, which can be a substantial percentage of the excess heat generated, particularly during low electrical power operations. Typically (where air flows through the tubes of the fuel cells and fuel gases flow through the plena containing the fuel cells), the nominal reaction temperatures and thermal profiles are maintained by feeding a certain amount of excess oxidant gas to the interior fuel cells in an array and simultaneously feeding substantially less excess oxidant gas to the peripheral fuel cells because of the lower excess heat remaining after losing heat to the housings. Undesirably, this requires additional air controllers to regulate the air flow in the peripheral cells separately from the air flow to the interior cells.

Present state-of-the-art generators employ arrays of fuel cells having electrochemically active lengths of up to about 30–50 centimeters. The installation of hundreds and even thousands of long injector tubes in such fuel cells is both costly and very difficult to accomplish in commercial scale generators. Furthermore, the art anticipates that future generators will employ even longer fuel cells having active lengths of up to 100 centimeters or more in order to reduce the required number of fuel cells in a generator.

Accordingly, the art is searching for new generator designs which are less costly and difficult to assemble than are present designs, and yet are more efficient.

SUMMARY OF THE INVENTION

It is an object of the present invention to provide an improved solid oxide fuel cell generator arrangement which is structurally less complicated than are present generator designs. It is another object of the present invention to provide a generator design which will efficiently operate over a wide range of power conditions. Another object is to permit the use of longer cells; e.g., cells up to 100–200 cm or more, with lower pressure drop.

With these objects in view, the present invention resides in a solid oxide fuel cell generator for electrochemically reacting a fuel gas with an oxidizing gas. A generator embodying the present invention generally has a housing containing two spaced apart tubesheets and at least two spaced apart, intermediate barrier walls between and spaced from the tubesheets. The housing and the barrier walls define a generator chamber spaced from the tubesheets. An array of spaced apart fuel cells extend through the generator chamber and engage the tubesheets. Each fuel cell comprises a hollow tube having a peripheral surface and an axial length which extends between two open tube ends engaging the tubesheets. Each fuel cell also has an electrochemical cell superposed on the peripheral surface of the tube in the generator chamber. An electrochemical cell generally comprises a solid oxide electrolyte and a contiguous electrical interconnector with the solid oxide electrolyte concentrically disposed between a fuel electrode and an oxidant electrode. The hollow tube supporting the electrochemical cell may also function as an electrode in some generator designs, although it is generally less costly to support both fuel and oxidant electrodes on the peripheral surface of another tube.

In one generator design embodying the present invention, the electrochemical cells axially extend at least about 50 centimeters (cm) and for less than about 60% of the total fuel cell length. In another preferred design, the active length of each fuel cell is at least about 100 cm. Such a design provides low total gas flow pressure drops in the fuel cells and at their ends and also provides a large heat transfer area for preheating and later cooling the gases as they flow through the fuel cells.

In a preferred embodiment of the present invention, the fuel cells seallessly engage the tubesheets whereby a small amount of gas leakage is permitted between the fuel cells and the tubesheets. Sealless generators have intermediate buffer chambers disposed between the generator chamber and the tubesheets. The buffer chambers and (preferably) gas pumping means such as an ejector and the like in gas flow communication with the buffer chambers mitigate gas leakage from the generator chamber and through the tubesheets.

In the above sealless generator arrangement, the generator chamber will inherently be at a higher pressure than the buffer chambers during the operation of the generator. Therefore, the leakage paths will be such that rich fuel will be permitted to leak out of the generator chamber. This generator design is arranged to entrain those leaked rich fuel gases into a depleted fuel gas stream, thereby preventing spontaneous combustion with the oxidant gas, and is recirculated back into the generator fuel supply. Thus, the fuel management and efficiency and thermal management is enhanced. In a similar manner, the generator arrangement provides a depleted fuel chamber adjacent to and at a higher pressure than the oxidant gas chamber at each end of the fuel cell. This also assures that the depleted fuel leaks around the fuel cells and through the flow holes in the tubesheet into the oxidant gas chamber where intended remaining combustion may occur. The buffer zone arrangement thus prevents the oxidant gas from leaking directly into the generator chambers containing the rich fuel.

DESCRIPTION OF THE DRAWINGS

The invention will become more readily apparent from the following description of two preferred embodiments thereof shown, by way of example only, in the accompanying drawings, wherein:

FIG. 1 schematically shows a first solid oxide fuel cell generator embodying the present invention;

FIG. 2 schematically shows a fuel cell which may be employed in the generator of FIG. 1;

FIG. 3 schematically shows a cross-sectional view of the fuel cell of FIG. 2, generally taken along section line 3—3.

DESCRIPTION OF THE PREFERRED EMBODIMENTS

Figure 4:
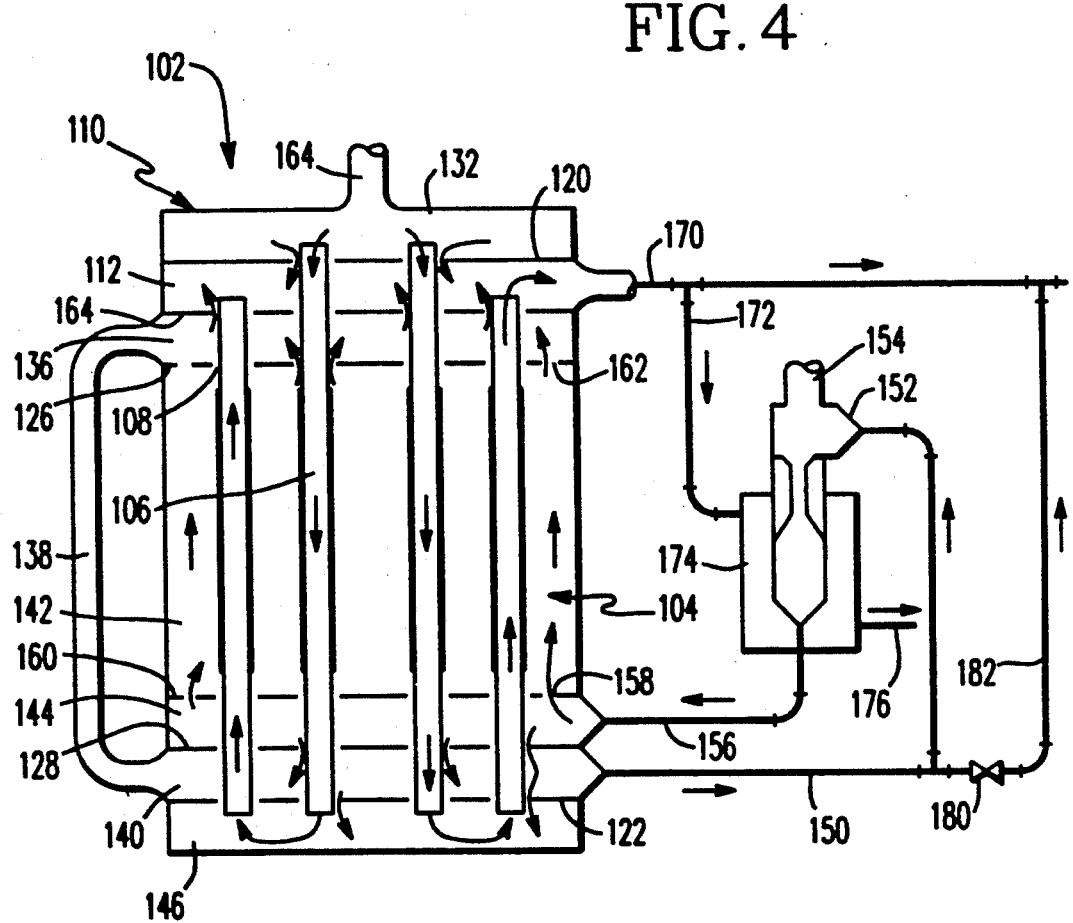
FIG. 4 schematically shows a second solid oxide fuel cell generator embodying the present invention.

Referring initially to FIGS. 1-3, FIG. 1 generally shows a solid oxide fuel cell generator 10 comprising a housing 12 containing a vertically oriented fuel cell array 13. Alternatively, the fuel cell array 13 may be horizontally or otherwise oriented to meet the particular process needs. The generator 10 of FIG. 1 is particularly useful for electrochemically reacting natural gas or another fuel gas with oxygen from air to produce electrical energy, although it may be employed with other process or waste fuel-containing gases and oxidant gases. Preferably, the gases do not contain substantial amounts of contaminating gases or entrained particles which may foul the generators. For purposes of convenient discussion, the invention will be described in the context of a generator wherein the oxidant gas (air) flows through the fuel cells and the fuel gas flows through the plena containing the fuel cells. However, the gas flows may be reversed in other embodiments of the present invention so that the fuel gas flows through the fuel cells.

The generator 10 of FIG. 1 has first and second tube sheets 14, 16 spaced apart in the housing 12 with at least two spaced apart intermediate barrier walls 18, 20 disposed between them. The intermediate barrier walls 18, 20 define a generator chamber 22. The intermediate barrier walls 18, 20 also partially define adjacent (to the generator chamber 22) buffer chambers 24, 26 disposed between the generator chamber 22 and the tubesheets 14, 16 respectively. The tubesheets 14, 16 may be comprised of stainless steel or Inconel and the barrier walls may be comprised of zirconia or other material having suitable high temperature physical properties. As is shown in FIG. 1, an additional barrier wall 28 may be employed in the generator chamber 22 to provide a distributor chamber 30 for distributing feed fuel gases across the fuel cell array 13 (as will be discussed below) and an additional barrier wall 32 may be employed adjacent one tubesheet 14 to provide a preheating chamber 34 to preheat the air flowing through the fuel cell array 13 (as will be discussed below). As is shown in FIG. 1, the buffer chambers 24, 26 are preferably interconnected by a duct 36 which may be external (as shown) or internal (not shown) of the fuel cell array 13.

The array 13 generally comprises hollow, cylindrical fuel cells 40 axially extending between the tubesheets 14, 16. Each fuel cell 40 has an open end 42 engaged with the first tubesheet 14 and an open end 44 engaged with the second tubesheet 16. The fuel cells 40 may have a supporting porous calcia-stabilized zirconia tubular structure 46 having a peripheral surface 48 and an axial length 50. A suitable tube 46 may have a thickness of about 0.5-5 mm and a diameter of about 1 cm. In an alternative embodiment (not shown), the fuel cell is supported by one of the electrodes so that a separate tubular support is not employed. Preferably, the fuel cells 40 seallessly engage the tubesheets 14, 16 such that gases are permitted to leak around the tubes and through the tubesheets 14, 16 (as well as through the barrier walls 18, 20, 28 and 32). Generally speaking, however, such gas leakage is undesirable and therefore the operating conditions in the generator (and particularly the pressure differential across the tube sheets 14, 16) are preferably maintained so as to reduce the leakage in the generator 10 to the lowest practical levels.

As is best seen in FIGS. 2 and 3, each fuel cell 40 has an electrochemical cell 51 superposed on the peripheral surface 48 of the tubular structure 46. The tubular structure 46 mechanically supports the electrochemical cell 51 in the generator chamber 22. The electrochemical cell 51 generally has concentric, porous air and fuel electrodes 52 and 54 separated by a nonporous solid oxide electrolyte 56. Where air is the oxidizing gas and flows through the support structure 46 from open end 42 to open end 44, the oxygen in the air generally diffuses outwardly through the porous zirconia of the support structure 46 and the porous air electrode 52. The oxygen then dissociates to an ionic form and the ions diffuse through the solid oxide electrolyte and react with the fuel at the fuel electrode 54 to form water vapor and carbon dioxide.

The air electrode 52 preferably has a thickness of at least about 0.5-2 mm and comprises a composite of doped or undoped oxides or mixture of oxides of the perovskite family, rare earths oxides, indium oxide, and oxides of cobalt, nickel, copper, iron, chromium and manganese. The fuel electrode 54 preferably has a thickness of at least about 100 μm and comprises a nickel-zirconia cermet or other suitable material. The solid oxide electrolyte 56 preferably has a thickness of at least about 20 μm and comprises yttria stabilized zirconia or other suitable ceramic material.

A nonporous, electrically conducting interconnector 58 radially extends from the air electrode 52 for interconnecting the fuel cell 40 and adjacent fuel cells (not shown) via nickel fiber felts or the like (not shown). The interconnector 58 preferably has a thickness of about 10-100 μm and comprises a calcium, strontium or magnesium oxide doped lanthanum chromite film or other suitable ceramic material.

A preferred fuel cell 40 has a 0.7 mm thick porous tube 46, a 2 mm air electrode 52, a 40 μm solid electrolyte, a 100 μm fuel electrode and a 40 μm interconnector 56.

Preferably, the electrochemical cells 51 axially extend at least about 50 cm in length in order to generate more power per fuel cell than do present cells, and also extend less than about 60% of the total length of the fuel cells 40 in order to provide a substantial heat transfer area between the air and the fuel gases. Advantageously, concentric injector tubes need not be provided to preheat the gases or to cool the fuel cells 40. In other embodiments of the invention, short injector tubes (not shown) may be employed to inject tubeside gases into the open ends 42 of the cells 40, although such arrangements are not preferred where the cell lengths are less than about 100 cm.

An ejector 70 or other gas pumping means may be employed to pump the gases from the intermediate buffer chambers 24 and 26 so that leaking fuel gas and air are buffered with spent gases. Importantly, the leakage across the tubesheet 16 is mitigated by the ejector 70. The pressure differential across the tubesheet 16 is generally maintained by pumping the gas in the intermediate chamber 26 through a pipe 72 into the suction of the eductor 70. A back pressure control valve 74 between the suction pipe 72 and a tubeside exhaust pipe 76 from a tubeside exhaust chamber 78 may be employed to more effectively control the pressure differential across the tubesheet 16. The ejector 70 shown employs feed fuel gas in supply pipe 80 to pump the spent fuel gas from the buffer chambers 24, 26. Advantageously, the educted gases may be reformed in the eductor 70 and reintroduced through pipe 82 into the fuel gas distribution chamber 30, which distributes the gas throughout the housing 12. The fuel gas in the ejector 70 is preferably heated (for reforming the spent fuel) by the exhaust air which flows from the exhaust pipe 76 through an ejector jacket 84 and then through a pipe 86 into the preheat chamber 34 for preheating the air. The fuel gas is also preheated in the intermediate distributor chamber 30 by the exhausted air. In other embodiments, the exhausted gases may not be reformed.

In operation, the generator 10 is continuously supplied with air from a supply pipe 88 which flows into an air supply chamber 90. The air flows into the ends 42 of the tubes 40 and into the preheat chamber 34 where it is preheated by the combusting spent gases, which are a mixture of the exhausted air from pipe 86 and spent fuel gas leaking through the intermediate barrier wall 32 and also supply air leaking through the tubesheet 14. The preheated air within the tubes 40 is further heated by spent fuel gases in the buffer chamber 24 and flows into the generator chamber 22 where it electrochemically reacts at cells 51. Exhausted air then flows through the tubes 46 into the intermediate distributor chamber 30 (where the exhausted air preheats the feed fuel gas) and then into the intermediate buffer chamber 26 before flowing into an exhaust chamber 78. The exhausted air then flows through pipe 76, ejector jacket 84 and pipe 86 and into the preheat chamber 34 where it is combusted with the spent fuel gas to preheat the supply air. The combusted gases are then discharged through outlet piping 92.

While the air is continuously fed to the air supply chamber 90, the fuel gas is introduced into the intermediate distributor chamber 30 (which is part of the generated chamber 22) where it is distributed across the cell array 13 and preheated. The gas then flows through orifices 94 in the intermediate barrier 28 into the generator chamber 22 proper, where the fuel gas electrochemically reacts at the cells 51. In other embodiments of the invention, the fuel gas may diffuse through a porous intermediate barrier wall (not shown) rather than flowing through the orifices 94 or be distributed within thermally insulated piping manifolds. In addition, the fuel is permitted to leak between the support tubes 46 and the barrier walls 18, 20, 28 and 32. The generator chamber 22 may also contain baffles (not shown) and the like to direct the fuel gas through the chamber 22. Spent fuel gas then flows from the generator chamber 22 through orifices 96 in the intermediate barrier wall 18 and into the intermediate buffer chamber 24 which is connected by duct 36 to the intermediate buffer chamber 26 adjacent the tubesheet 16. A portion of the gas in the intermediate buffer chamber 24 leaks through the intermediate barrier wall 32 into the adjacent intermediate preheat chamber 34 where the gas is combusted to preheat the supply air. The balance of the gas in the intermediate chamber 24 is pumped into the intermediate chamber 26 to buffer the fuel gas leakage into the air at the tubesheet 16. It should be noted that spent fuel gas in the buffer chamber 24, 26 leak away from the generator chamber 22. Advantageously, the ejector 70 maintains a pressure differential across the tubesheet 16 so that leakage can be maintained and controlled.

FIG. 4 shows a second embodiment of the present invention where a generator 102 has an array 104 of interior fuel cells 106 arranged in serial gas flow with peripheral shortened fuel cells 108 which are adjacent to the housing 12. Advantageously, such an arrangement introduces hot tubeside gases to the peripheral cells 108 under any transient or steady state operating conditions including high power conditions. Thus additional air flow controllers are not required to separately control the peripheral fuel cells 108 to compensate for heat losses to the housing 110 due to radiation. In addition, the exhausted air may be internally introduced into a preheater such as intermediate combustion chamber 112 with little pressure drop.

The generator 102 has first and second tubesheets 120, 122 spaced apart in the housing 110 from intermediate barrier walls 126 and 128. This structure generally defines an air supply chamber 132, the intermediate combustion chamber 112 for preheating the air, an intermediate buffer chamber 136 connected by duct 138 to an intermediate buffer chamber 140 for buffering gas leakage from a generator chamber 142, an appurtenant intermediate distribution chamber 144 for preheating and distributing fuel gas before it flows through the generator chamber 142, and an air exhaust chamber 146. The spent gases in chambers 136 and 140 are pumped through a suction pipe 150 into an ejector 152 or other gas pumping means. As is shown, the spent gases may be reformed and returned to the intermediate distributor chamber 144 through pipe 156 along with the feed fuel gas. The feed and reformed fuel gases are preheated in the intermediate distribution chamber 144 and then flow through orifices 158 in a barrier wall 160 and into the generator chamber 142 where they react at the fuel cells 106 and 108. The spent gases then flow through orifices 162 in the barrier wall 126 into the intermediate buffer chamber 136, and a portion leaks through a tubesheet 164 into the intermediate combustion chamber 112 where they are combusted with the exhausted air to preheat the feed air gas. The combusted gases in the intermediate combustion chamber 112 flow from the generator 102 through an outlet pipe 170. A portion of the combusted gases flow through a branch pipe 172 and into a heating jacket 174 on the ejector 154 for reforming the spent fuel and then out trough a pipe 176. A control valve 180 in a pipe 182 extending between the suction pipe 15 and the outlet pipe 170 may be employed to mitigate gas leakage in the intermediate buffer chamber 140 and pressure differential around the adjacent tubesheet 122.

In the generator 102 of FIG. 4, the feed air gas flows through an inlet 164 into the air supply chamber 132. The air flows through the interior cells 106 and into the exhaust chamber 146. The oxidant gases in the air exhaust chamber 146 then flow into the peripheral tubes. The hot air gas then flows in the reverse direction in the peripheral cells 108 and into the intermediate combustion chamber 112 where it combusts with the leaking spent fuel gas to preheat the feed air. Thus the peripheral tubes will always be supplied with preheated air, even at very low power levels when the gas flow rates are low, which maintains the generator peripheral cells 108 at a high temperature even when the excess thermal power level is low. In a preferred embodiment of the present invention, a generator 102 has an array 104 of 2016 fuel cells, with the peripheral three rows of cells 108 serially arranged downstream of the interior cells 106 so that about 25% of the tubes are serially downstream of about 75% of the tubes.

Generators embodying the present invention are structurally more simple than are the currently designed generators because the long concentric gas injector tubes are not required and because close tolerances between the support tubes and the tubesheets and barrier walls are not necessary. In addition, generators arranged with the peripheral fuel cells serially downstream of the interior fuel cells do not need additional flow controllers to separately control gas flow through the peripheral cells to compensate for thermal radiation losses.

While presently preferred embodiments of the present invention have been shown and described as well as certain objects, advantages and details thereof, it is to be distinctly understood that the invention is not limited thereto but may be otherwise variously embodied within the scope of the following claims.

We claim:

1. A solid oxide fuel cell generator for electrochemically reacting a fuel gas with an oxidizing gas, comprising:
   a housing;
   first and second spaced apart tubesheets disposed in the housing;
   at least two spaced apart, intermediate barrier walls between and spaced from the tubesheets, the at least two intermediate barrier walls and housing defining a generator chamber spaced from the tubesheets; and
   an array of spaced apart fuel cells;
   each fuel cell comprising:
   a hollow tube having a peripheral surface and an axial length extending through the generator chamber between two open tube ends, the one tube end engaging the first tubesheet and the second tube end engaging the second tubesheet; and
   an electrochemical cell superposed on the peripheral surface of the tube in the generator chamber, the electrochemical cell comprising a solid oxide electrolyte and a contiguous electrical interconnector, the solid oxide electrolyte concentrically disposed between a fuel electrode and an oxidant electrode.

2. The solid oxide fuel cell generator of claim 1, wherein the electrochemical cells axially extend along the lengths of the hollow tubes for at least about 50 cm and for less than about 60% of the axial lengths of the tubes.

3. The solid oxide fuel cell generator of claim 2, wherein the electrochemical cells axially extend along the lengths of the hollow tubes for at least about 100 cm.

4. The solid oxide fuel cell generator of claim 1, wherein the fuel cells seallessly engage the tubesheets, whereby gases are permitted to leak around the fuel cells through the tubesheets.

5. The solid oxide fuel cell generator of claim 4, wherein the barrier walls define walls of buffer chambers disposed between the generator chamber and the tubesheets, the buffer chambers disposed in gas flow communication with the generator chamber for receiving gases therefrom.

6. The solid oxide fuel cell generator of claim 5, further comprising a gas pumping means having a suction connection in gas flow communication with the buffer chambers for pumping the gases received from the generator chamber.

7. The solid oxide fuel cell generator of claim 6, wherein the gas pumping means has a discharge connection in gas flow communication with the generator chamber for pumping at least some of the gases from the buffer chambers to the generator chamber.

8. The solid oxide fuel cell generator of claim 5, wherein at least one of the buffer chambers which receives gases from the generator chamber is adjacent a tubesheet, and further comprising a gas pumping means having a suction connection in fluid flow communication with the buffer chamber adjacent the tubesheet for mitigating the leakage of gas through the adjacent tubesheet.

9. The solid oxide fuel cell generator of claim 1, further comprising:
   an exhaust chamber in gas flow communication with the open ends of the tubes engaged with the second tubesheet;
   an intermediate tubesheet spaced from the first tubesheet and disposed between the first tube sheet and the generator chamber; and
   fuel cells disposed adjacent the housing and having shortened tubes spaced from the first tubesheet, each shortened tube having an open end engaging the second tubesheet and an open end spaced from the first tubesheet which engages the intermediate tubesheet, the shortened tubes in gas flow communication with the exhaust chamber, whereby the shortened tubes are disposed in downstream serial gas flow with the tubes engaging the first and second tubesheets.

10. The solid oxide fuel cell generator of claim 9, wherein the electrochemical cells axially extend along the lengths of the hollow tubes for at least about 50 cm and for less than about 60% of the axial lengths of the tubes.

11. The solid oxide fuel cell generator of claim 10, wherein the electrochemical cells axially extend along the lengths of the hollow tubes for at least about 100 cm.

12. The solid oxide fuel cell generator of claim 9, wherein the fuel cells seallessly engage the tubesheets, whereby gases are permitted to leak around the fuel cells through the tubesheets.

13. The solid oxide fuel cell generator of claim 12, wherein the barrier walls define walls of buffer chambers disposed between the generator chamber and the tubesheets, the buffer chambers disposed in gas flow communication with the generator chamber for receiving gases therefrom.

14. The solid oxide fuel cell generator of claim 13, further comprising a gas pumping means having a suction connection in gas flow communication with the buffer chambers for pumping the gases received from the generator chamber.

15. The solid oxide fuel cell generator of claim 14, wherein the gas pumping means has a discharge connection in gas flow communication with the generator chamber for pumping at least some of the gases from the buffer chambers to the generator chamber.

16. The solid oxide fuel cell generator of claim 13, wherein at least one of the buffer chambers which receives gases from the generator chamber is adjacent a tubesheet, and further comprising a gas pumping means having a suction connection in fluid flow communication with the buffer chamber adjacent the tubesheet for mitigating the leakage of gas through the adjacent tubesheet.

* * * * *